(12) United States Patent
Tamaki

(10) Patent No.: US 9,832,329 B2
(45) Date of Patent: Nov. 28, 2017

(54) NON-TRANSITORY COMPUTER-READABLE MEDIUM STORING PROGRAMS FOR INFORMATION PROCESSING APPARATUS, INFORMATION PROCESSING APPARATUS, AND INFORMATION PROCESSING METHOD

(71) Applicant: BROTHER KOGYO KABUSHIKI KAISHA, Nagoya-shi, Aichi-ken (JP)

(72) Inventor: Kenji Tamaki, Ichinomiya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 144 days.

(21) Appl. No.: 14/664,469

(22) Filed: Mar. 20, 2015

(65) Prior Publication Data
US 2015/0281480 A1     Oct. 1, 2015

(30) Foreign Application Priority Data
Mar. 28, 2014 (JP) ................. 2014-067752

(51) Int. Cl.
| | |
|---|---|
| *H04N 1/00* | (2006.01) |
| *G09G 5/14* | (2006.01) |
| *G06T 3/40* | (2006.01) |
| *G06T 11/60* | (2006.01) |

(52) U.S. Cl.
CPC ........ *H04N 1/00456* (2013.01); *G06T 11/60* (2013.01); *G09G 5/14* (2013.01); *G09G 2340/045* (2013.01)

(58) Field of Classification Search
CPC ........................ H04N 1/00442; G06T 11/60
USPC ............................................ 345/625; 358/453
See application file for complete search history.

(56) References Cited

U.S. PATENT DOCUMENTS

| | | | | |
|---|---|---|---|---|
| 6,941,276 B2* | 9/2005 | Haeberli | ............ | G06Q 30/0621 345/619 |
| 7,796,296 B2* | 9/2010 | Martinez | .............. | H04N 1/6011 358/1.9 |
| 2004/0190025 A1* | 9/2004 | Nomura | ............. | H04N 1/00132 358/1.9 |
| 2004/0239982 A1* | 12/2004 | Gignac | .................... | G06T 3/00 358/1.15 |
| 2006/0072174 A1 | 4/2006 | Koike et al. | | |

(Continued)

FOREIGN PATENT DOCUMENTS

| | | |
|---|---|---|
| JP | 2006-085276 A | 3/2006 |
| JP | 2012-247784 A | 12/2012 |

*Primary Examiner* — Kimberly A Williams
(74) *Attorney, Agent, or Firm* — Merchant & Gould P.C.

(57) ABSTRACT

A non-transitory computer-readable medium stores computer-executable programs. The programs cause an information processing apparatus provided with a display unit having a display surface and an operation unit configured to output a signal depending on user operations to perform: displaying a target image which is an image to be selected in a first area of the display surface; specifying a selected area corresponding to a part of the target image or a whole of the target image, based on the signal outputted from the operation unit depending on the user operation with respect to the target image; and displaying a selected-area image which is an image corresponding to the selected area that has been specified, in a second area which is different from the first area, with a size same as a size of the selected area that has been specified.

17 Claims, 11 Drawing Sheets

(56) References Cited

U.S. PATENT DOCUMENTS

2007/0146833 A1\* 6/2007 Satomi ................. G11B 27/034
  358/537
2010/0123735 A1\* 5/2010 Blanchard .......... H04N 5/44591
  345/620

\* cited by examiner

NON-TRANSITORY COMPUTER-READABLE MEDIUM STORING PROGRAMS FOR INFORMATION PROCESSING APPARATUS, INFORMATION PROCESSING APPARATUS, AND INFORMATION PROCESSING METHOD

CROSS REFERENCE TO RELATED APPLICATION

The present application claims priority from Japanese Patent Application No. 2014-067752, filed on Mar. 28, 2014, the disclosure of which is incorporated herein by reference in its entirety.

BACKGROUND

Field of the Invention

The present invention relates to an information processing apparatus which includes a display unit, storage medium storing programs for the information processing apparatus, and an information processing method.

Description of the Related Art

In an information processing apparatus which includes a display unit, it is possible to display an image on a display screen of the display unit, and to execute a trimming processing of the displayed image. Concretely, as described Japanese Patent Application Laid-open No. 2012-247784 for example, an image to be subjected to the trimming processing is displayed on the display screen, and a user specifies a predetermined area of the displayed image by using an operation unit such as a mouse. Moreover, an image included in the specified area is displayed on the display screen apart from the image which is subjected to the trimming processing.

SUMMARY

However, even if only the image included in the area specified by using the operation unit is displayed on the display screen, the user cannot identify appropriately an image after the trimming processing, and an operability of the trimming processing is poor. The present teaching has been made in view of the abovementioned circumstances, and an object of the present teaching is to improve the operability of the trimming processing.

According to a first aspect of the present teaching, there is provided a non-transitory computer-readable medium storing computer-executable programs that, when executed by a processor, cause an information processing apparatus provided with a display unit having a display surface and an operation unit configured to output a signal depending on a user operation, to perform: displaying a target image which is an image to be selected in a first area of the display surface; specifying a selected area corresponding to one of a part of the target image and a whole of the target image, based on the signal outputted from the operation unit depending on the user operation with respect to the target image; and displaying a selected-area image which is an image corresponding to the selected area that has been specified, in a second area which is different from the first area, with a size same as a size of the selected area that has been specified.

According to a second aspect of the present teaching, there is provided an information processing apparatus including, a display unit having a display surface; an operation unit configured to output a signal depending on a user operation; and a controller, wherein the controller is configured to: display a target image which is an image to be selected in a first area of the display surface, specify a selected area corresponding to one of a part of the target image and a whole of the target image, based on the signal outputted from the operation unit depending on the user operation with respect to the target image, and display a selected-area image which is an image corresponding to the selected area that has been specified, in a second area which is different from a first area of the display surface, with same size as a size of the selected area that has been specified.

According to a third aspect of the present teaching, there is provided an information processing method to be executed by an information processing apparatus provided with a display unit having a display surface and an operation unit configured to output a signal depending on a user operation, the method including: displaying a target image which is an image to be selected in a first area of the display surface; specifying a selected area corresponding to one of a part of the target image and a whole of the target image, based on the signal outputted from the operation unit depending on the user operation with respect to the target image; and displaying a selected-area image which is an image corresponding to the selected area that has been specified, in a second area which is different from the first area, with a size same as a size of the selected area that has been specified.

In the information processing apparatus according to the aspects of the present teaching, the target image is displayed in the first area of the display screen, and the selected area corresponding to a part of the target image or a whole of the target image is selected depending on the user operation with respect to the target image. Moreover, the selected-area image which is an image corresponding to the selected area selected by the user operation is displayed in the second area which is different from the first area of the display surface, with the same size as that of the selected area that has been selected by the user operation. Accordingly, the user is able to identify appropriately an image after the trimming processing, and operability of the trimming processing is improved.

DETAILED DESCRIPTION OF THE EMBODIMENTS

<Configuration of Communication System>

Figure 1:
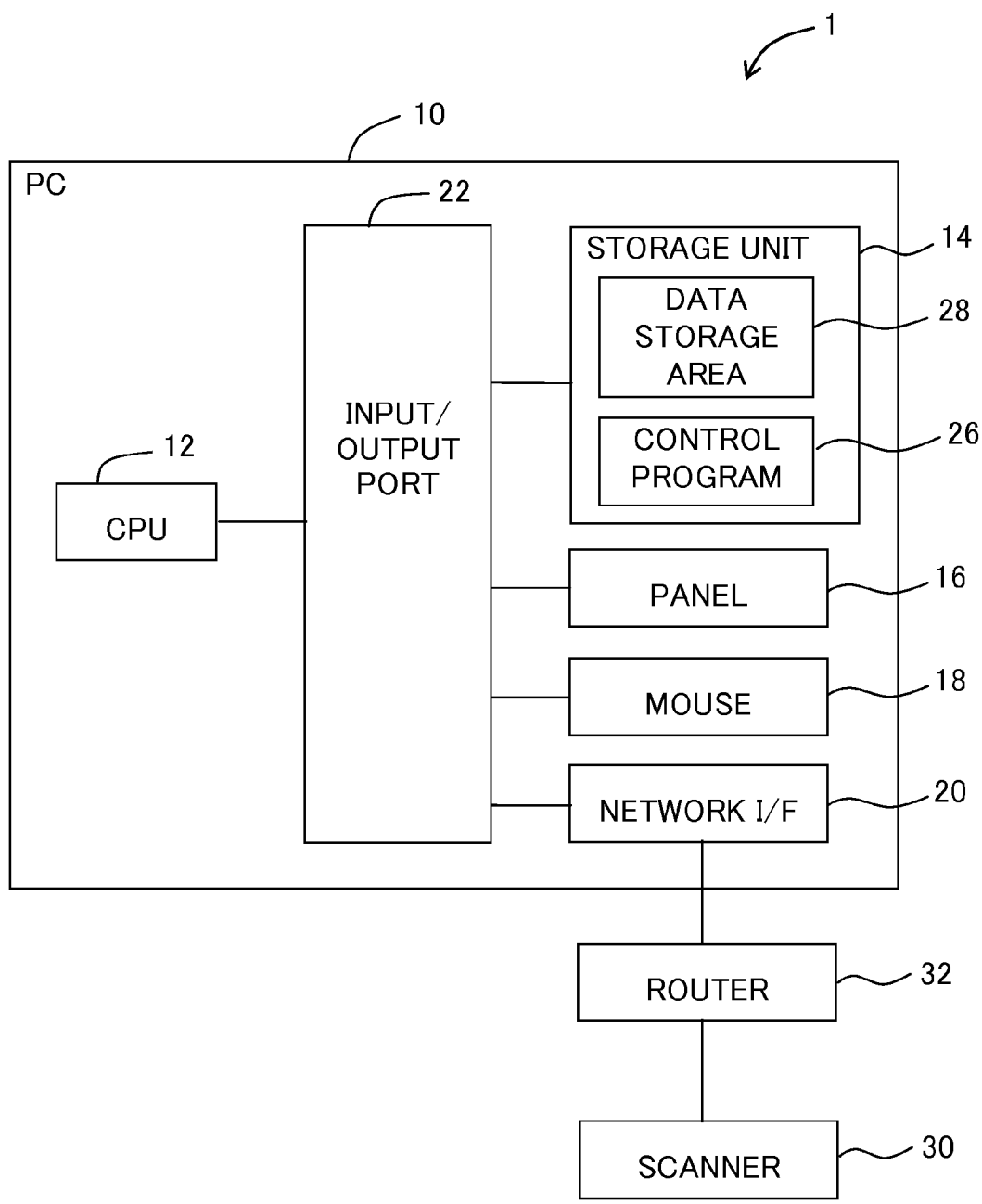
FIG. 1 is a block diagram of a communication system.

A communication system 1 which is exemplified as a first embodiment of the present patent application will be described below while referring to FIG. 1. The communication system 1 includes a PC (abbreviation for personal computer) (an example of an information processing apparatus of the present teaching) 10, a scanner 30, and a router 32.

The PC 10 includes mainly, a CPU (abbreviation for central processing unit) (an example of a control unit and a computer of the present teaching) 12, a storage unit 14, a panel (an example of a display unit of the present teaching) 16, a mouse (an example of an operation unit of the present teaching) 18, a network I/F (an example of communication unit of the present teaching) 20. These components are arranged to be mutually communicable via an input-output port 22.

The network I/F 20 is arranged to be communicable with an external device via the router 32. Since the network I/F 20 is connected to the scanner 30 via the router 32, the PC 10 is capable of transceiving various data to and from the scanner 30.

The panel 16 includes a display screen, and displays on the display screen an image etc. based on image data. The mouse 18 is arranged to move a pointer displayed on the display screen of the panel 16 by receiving operations such as a drag operation and a click operation by a user.

The CPU 12 executes a processing in accordance with a control program (an example of programs of the present teaching) 26. The control program 26 is a computer program for executing a processing of clipping at least a part of an image displayed on the display screen of the panel 16, or in other words, a computer program for executing a trimming processing. From here onward, sometimes the CPU 12 which executes a computer program such as the control program 26 is mentioned as only a computer program name. For example "control program 26" sometimes refers to "the CPU 12 which executes the control program 26".

The storage unit 14 is formed by combining a RAM (an abbreviation for random access memory), a ROM (an abbreviation for read only memory), a flash memory, and HDD (an abbreviation for hard disc drive), and a buffer etc. included in the CPU 12. Moreover, the storage unit 14 includes a data storage area (an example of a storage unit of the present teaching) 28. The data storage area 28 is an area which stores scan data acquired from the scanner and data necessary for executing the control program 26.

<Trimming Processing in PC>

In the communication system 1, after the scanner 30 has executed a scan processing in accordance with a scan command from the PC 10, scan data generated by the scan processing is transmitted to the PC 10. Moreover, in the PC 10, the trimming processing of an image based on the scan data is carried out.

Figure 2:
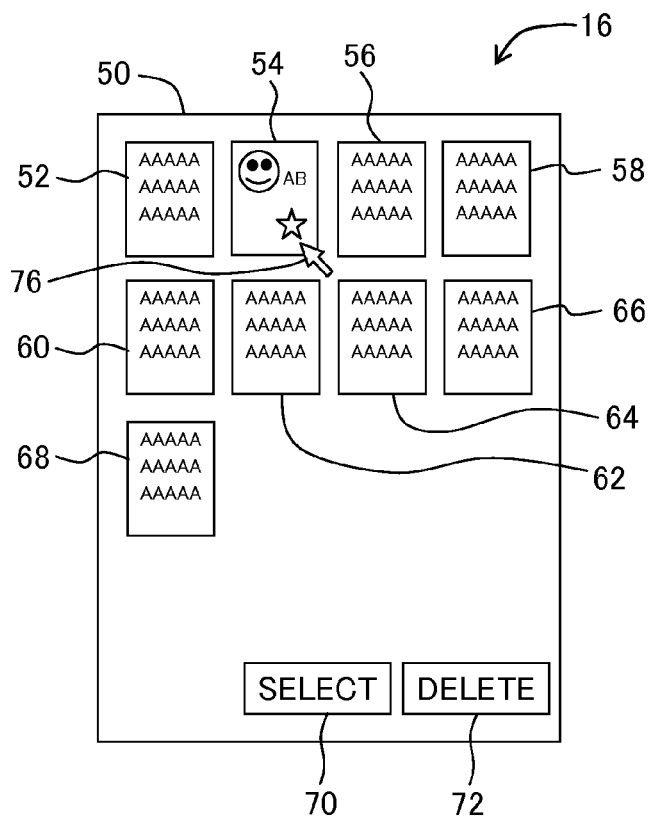
FIG. 2 is a diagram showing a thumbnail window.

More elaborately, a plurality of scan data acquired from the scanner 30 has been stored for each folder, in the data storage area 28 of the PC 10. As an arbitrary folder is selected from the plurality of folders, as shown in FIG. 2, a thumbnail window 50 is displayed on the display screen of the panel 16. A plurality of images 52, 54, 56, 58, 60, 62, 64, 66, and 68 (hereinafter, the plurality of images 52 to 68) based on the plurality of scan data that has been stored in the folder selected, a select button 70, and a delete button 72 are displayed on the thumbnail window 50. The select button 70 is a button for selecting an image which is to be subjected to the trimming processing, and the delete button 72 is a button for deleting an image for which an operation by a user has been received.

Therefore, by the user carrying out a selection operation by operating the mouse 18, to move a pointer 76 by on the select button 70 after carrying out a selection operation by moving the pointer 76 on the arbitrary image 54 from among the plurality of images 52 to 68, the image 54 is selected as an image to be subjected to the trimming processing. In the following description, sometimes, carrying out the selection operation by the user operating the mouse to move the pointer 76 on a predetermined image or a button etc. displayed on the panel 16 will be referred to as a selection operation for the predetermined image or button. A left click can be cited as an example of the selection operation.

Figure 3:
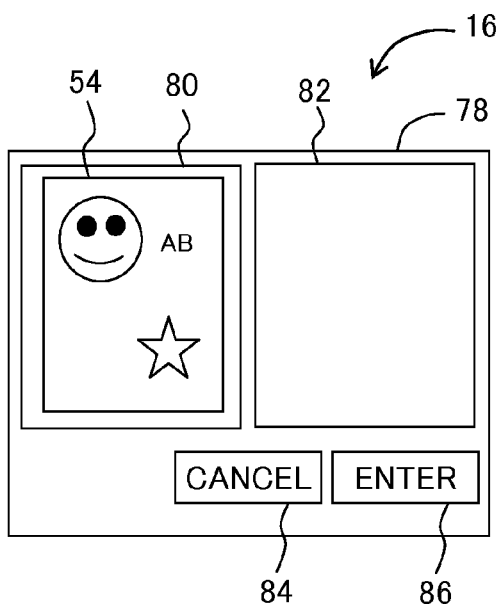
FIG. 3 is a diagram showing a trimming window in which a target image is displayed.

As an image 54 that is to be subjected to the trimming processing (hereinafter, sometimes referred to as "target image") is selected, a trimming window 78 as shown in FIG. 3 is displayed instead of the thumbnail window 50 on the panel 16. A first area 80, a second area 82, a cancel button 84, and an enter button 86 are displayed on the trimming window 78. The first area 80 is an area for displaying the target image 54 which is to be subjected to trimming (which is to be trimmed). The image displayed on the first area 80 is displayed in a state of being enlarged to be larger than an image that is displayed on the thumbnail window 50. Moreover, the second window 83 is an area for displaying an image that has been trimmed. The first area 80 and the second area 82 are displayed to be arranged side-by-side on the trimming window 78, and are of the same size.

Figure 4:
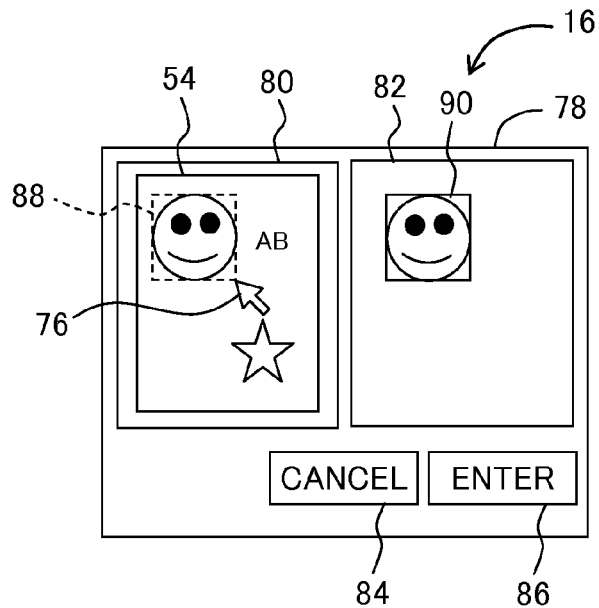
FIG. 4 is a diagram showing the trimming window in which the target image and a trimming image are displayed.

On the trimming window 78, by moving the pointer 76 in a state of a left-click carried out after the selection operation has been carried out with respect to any location on the target image 54 displayed on the first area 80, a substantially rectangular demarcation lines 88 are displayed on the target image 54 as shown in FIG. 4. At this time, an image same as an image in an area demarcated by the demarcation lines 88 (an example of a selected area of the present teaching) is displayed on the second area 82 as a trimming image (an example of a selected-area image of the present teaching) 90. An operation of moving the pointer 76 in a state of the left-click operation carried out after the selection operation with respect to an arbitrary location on the target image 54, is sometimes referred to as a drag operation.

The trimming image 90 has a size same as a size of an image in the area demarcated by the demarcation lines 88. Moreover, a display position of the trimming image 90 on the second area 82 is same as a display position of the image in the area demarcated by the demarcation lines 88 on the first area 80. Since the user can check by arranging side-by-side, an image before trimming and the trimming image, it is possible to carry out an appropriate trimming processing.

Next, by the enter button 86 being operated in a state of the trimming image 90 displayed on the second area 82, the trimming image 90 that has been displayed on the second area 82 is confirmed to be an image after the processing. Moreover, in a case that the cancel button 84 is pressed in a state of the trimming image 90 displayed on the second area 82, the demarcation lines 88 and the trimming image 90 are hidden (not displayed), and the trimming processing is cancelled.

Figure 5:
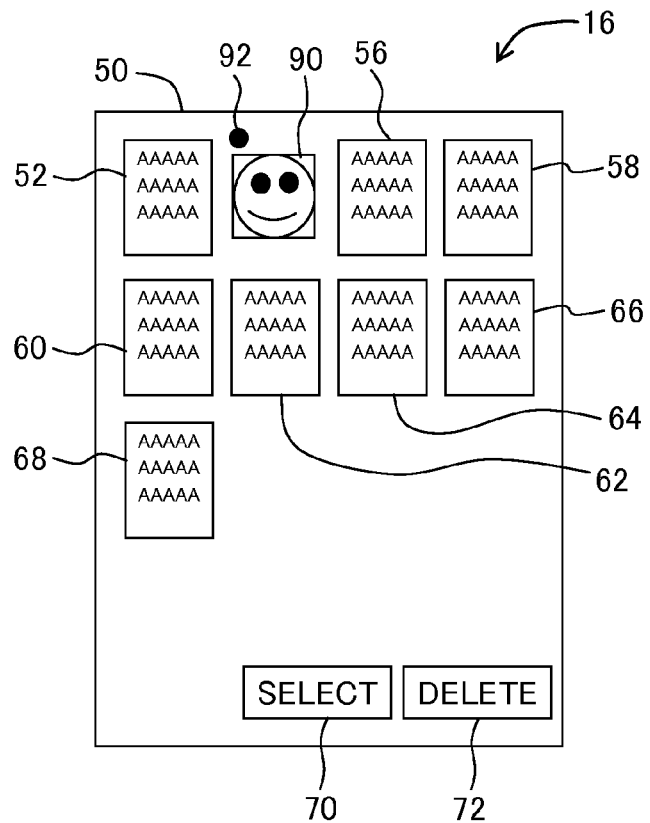
FIG. 5 is a diagram showing the thumbnail window in which the trimming image is displayed instead of the target image.

As the trimming image 90 is confirmed as an image after the trimming processing, the thumbnail window 50 is displayed instead of the trimming window 78 on the panel 16 as shown in FIG. 5. Images excluding the target image 54 from among the plurality of images 52 to 68 that were displayed on the thumbnail window 50 in FIG. 2 are displayed on this thumbnail window 50, and the trimming image 90 is displayed instead of the target image 54. In other words, the target image 54 is deleted from the plurality of images 52 to 68 that were displayed on the thumbnail window 50 in FIG. 2, and the trimming image 90 is displayed instead of the target image 54. Although the image before the trimming processing of the trimming image 90, or in other words, the target image 54, is deleted from the panel 16, image data of the target image 54 without being deleted from the data storage area 28, is stored in the data storage area 28 upon associating with image data of the trimming image 90.

Moreover, an identification mark 92 is displayed at an upper left side of the trimming image 90. The identification mark 92 is a mark indicating that an image to which the identification mark 92 is assigned is an image after the trimming processing. Accordingly, it is possible for the user to identify easily as to which image out of the plurality of images displayed on the thumbnail window 50 is an image after the trimming processing. The identification mark 92 has a round shape.

Figure 6:
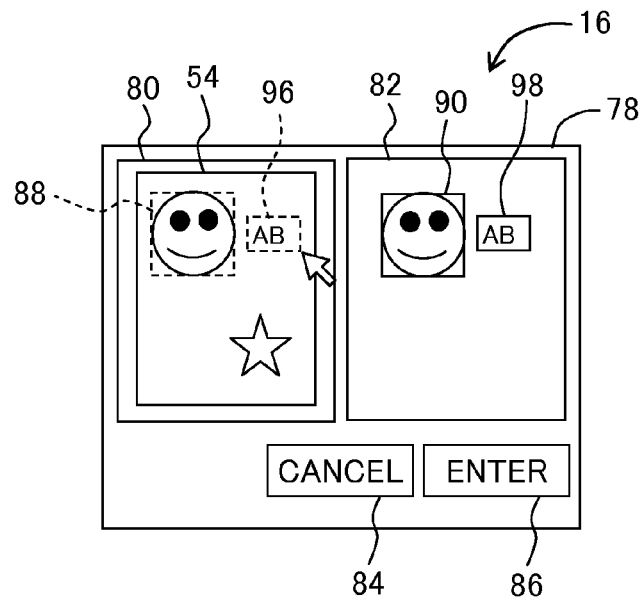
FIG. 6 is a diagram showing the trimming window in which the target image and a plurality of trimming images are displayed.

Moreover, in the abovementioned trimming processing, one trimming image was trimmed from one target image. However, it is possible to trim a plurality of trimming images from one target image. More elaborately, as shown in FIG. 4, after the trimming processing has been carried out by a drag operation for the target image 54 displayed on the first area 80, if the drag operation is carried out once again for that target image 54, as shown in FIG. 6, demarcation lines 96 different from the demarcation lines 88 that had been displayed first are displayed on the target image 54. At this time, an image same as an image in an area demarcated by the demarcation lines 96 is displayed as a trimming image 98 together with the trimming image 90 on the second area 82.

Incidentally, the trimming image 98, similarly as the trimming image 90 has a size same as a size of the image in the area demarcated by the demarcation lines 96. Moreover, similarly as the trimming image 90, a display position of the trimming image 98 on the second area 82, is same as a display position of the image in the area demarcated by the demarcation lines 96 on the first area 80.

Figure 7:
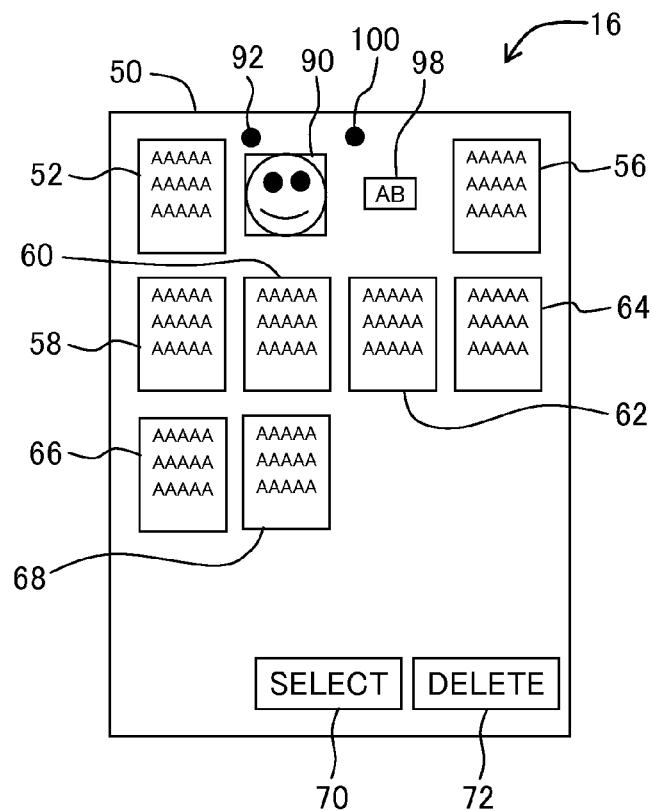
FIG. 7 is a diagram showing the thumbnail window in which a plurality of trimming images trimmed from one image is displayed.

Moreover, as the enter button 86 is operated in a state of the trimming image 90 and the trimming image 98 displayed on the second area 82, the thumbnail window 50 is displayed instead of the trimming window 78 on the panel 16 as shown in FIG. 7. Images excluding the target image 54 from among the plurality of images 52 to 68 that had been displayed on the thumbnail window 50 in FIG. 2 are displayed on this thumbnail window 50, and the trimming image 90 and the trimming image 98 are displayed instead of the target image 54. In other words, the target image 54 is deleted from the plurality of images 52 to 68 that had been displayed on the thumbnail window 50 in FIG. 2, and the trimming image 90 and the trimming image 98 are displayed instead of the target image 54. Moreover, image data of that target image 54 is stored in the data storage area 28 upon associating with image data of the trimming image 90 and image data of the trimming image 98.

Moreover, the identification mark 92 is displayed at the upper left side of the trimming image 92, and an identification mark 100 is displayed at an upper left side of the trimming image 98. The identification mark 92, as mentioned above, has a round shape, and the identification mark 100 also has a round shape. In other words, the identification mark of the same shape is assigned to each of the trimming image 90 and the trimming image 98. Both the trimming image 90 and the trimming image 98 are images trimmed from the same target image 54. However, at the time of displaying the trimming images trimmed from different images on the thumbnail window 50, identification marks having shapes different from the shape of the identification mark 92 and the shape of the identification mark 100 are assigned to those trimming images.

Figure 8:
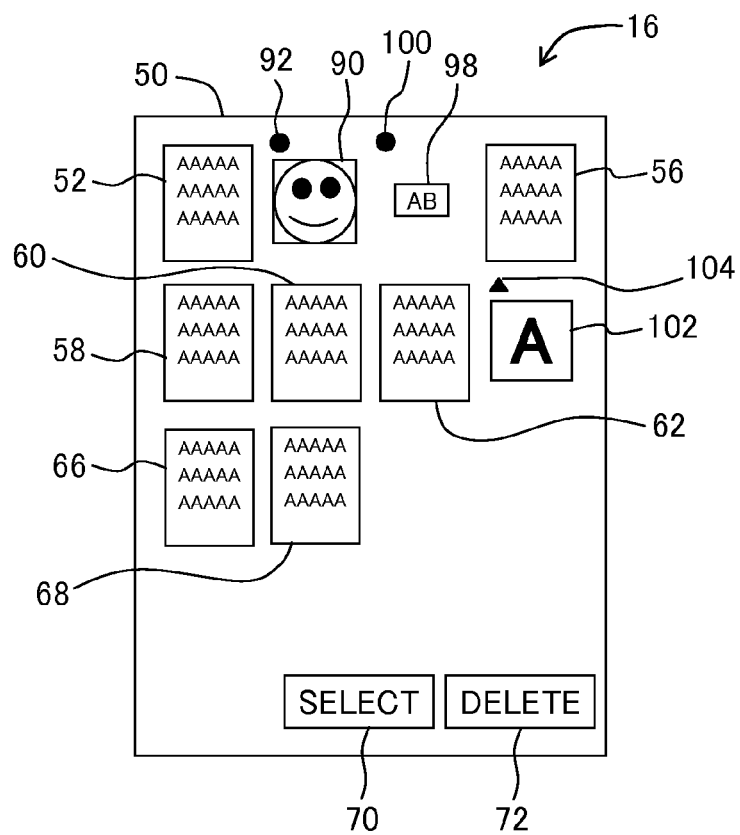
FIG. 8 is a diagram showing the thumbnail window in which a plurality of trimming images trimmed from different images is displayed.

Concretely, the image 64 is selected as a target of the trimming processing on the thumbnail window 50 shown in FIG. 7 for example, and in a case that the trimming processing has been carried out for the image 64 on the trimming window 78, a trimming image 102 trimmed from the image 64 is displayed instead of the image 64 on the thumbnail window 50 as shown in FIG. 8. An identification mark 104 is displayed at an upper left side of the trimming image 102. The identification mark 104 has a triangular shape. Therefore, it is possible for the user to realize easily that an image before the trimming processing of the trimming image 90 and the trimming image 98 have been trimmed from the same image, and the trimming image 102 has been trimmed from an image different from the image from which the trimming images 90 and 98 have been trimmed.

Moreover, in a case that a trimming image that has been displayed on the thumbnail window 50 is selected as a target of trimming, a new (fresh) trimming processing is carried out, and a trimming image created by the new trimming processing is displayed on the thumbnail window 50. For instance, as a selection operation is carried out for the trimming image 90 on the thumbnail window 50 shown in FIG. 5, and the select button 70 is operated, the trimming window 78 is displayed instead of the thumbnail window 50 on the panel 16 as shown in FIG. 4. In the trimming window 78, the trimming image 90 that was selected is displayed on the second area 82, and the target image 54 which is an image before the trimming image 90 is subjected to the trimming processing is displayed on the first area 80.

Figure 9:
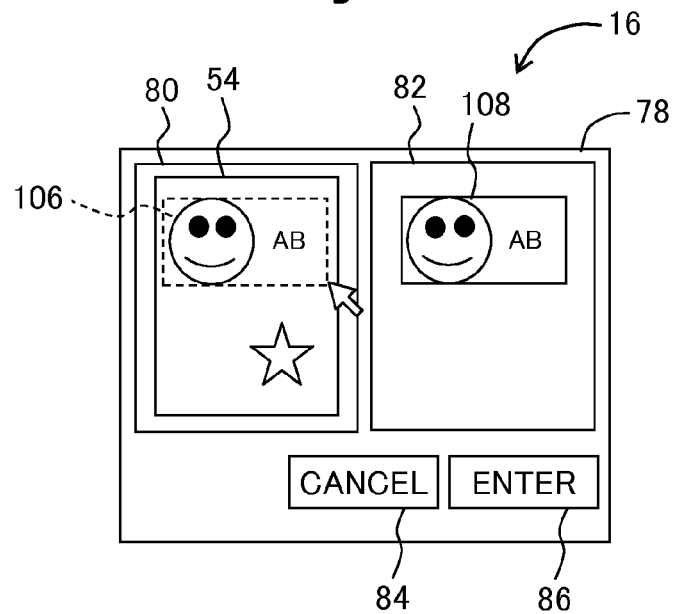
FIG. 9 is a diagram showing the trimming window in which the target image and a new trimming image are displayed.

Moreover, as a drag operation is carried out for the target image 54 displayed on the first area 80, the demarcation lines 88 displayed first are hidden, and as shown in FIG. 9, new demarcation lines 106 are displayed on the target image 54. At this time, an image same as an image in an area demarcated by the demarcating lines 106 is displayed as a trimming image 108 instead of the trimming image 90, on the second area 82.

The trimming image 108 also has a size same as a size of the image in the area demarcated by the demarcation lines 106. Moreover, a display position of the trimming image 108 on the second area 82 is same as a display position of the image in the area demarcated by the demarcation lines 106 on the first area 80.

Figure 10:
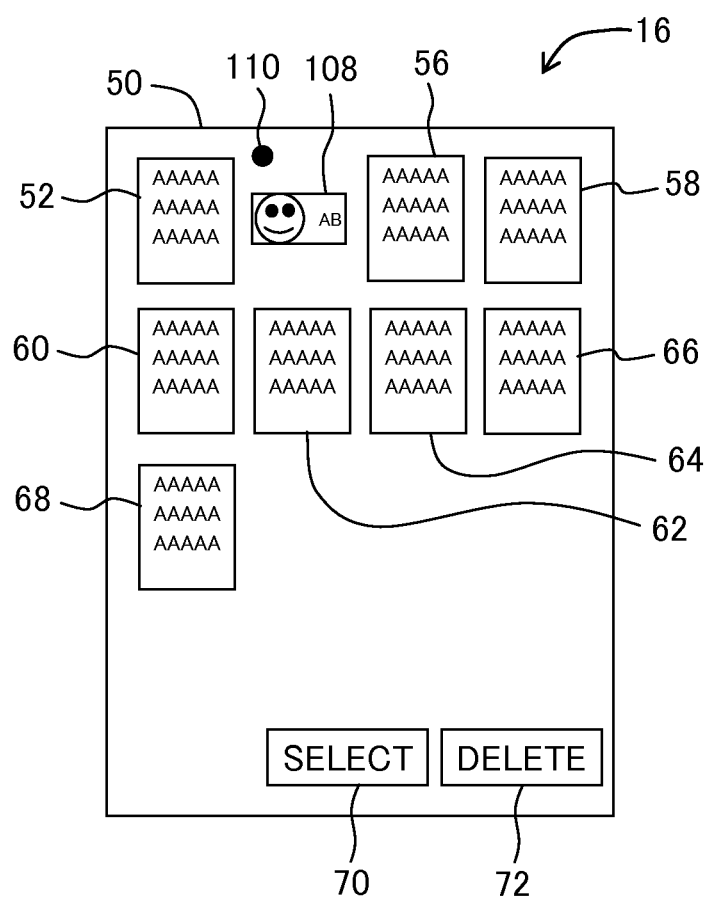
FIG. 10 is a diagram showing the thumbnail window in which the new trimming image is displayed.
Figure 11A:
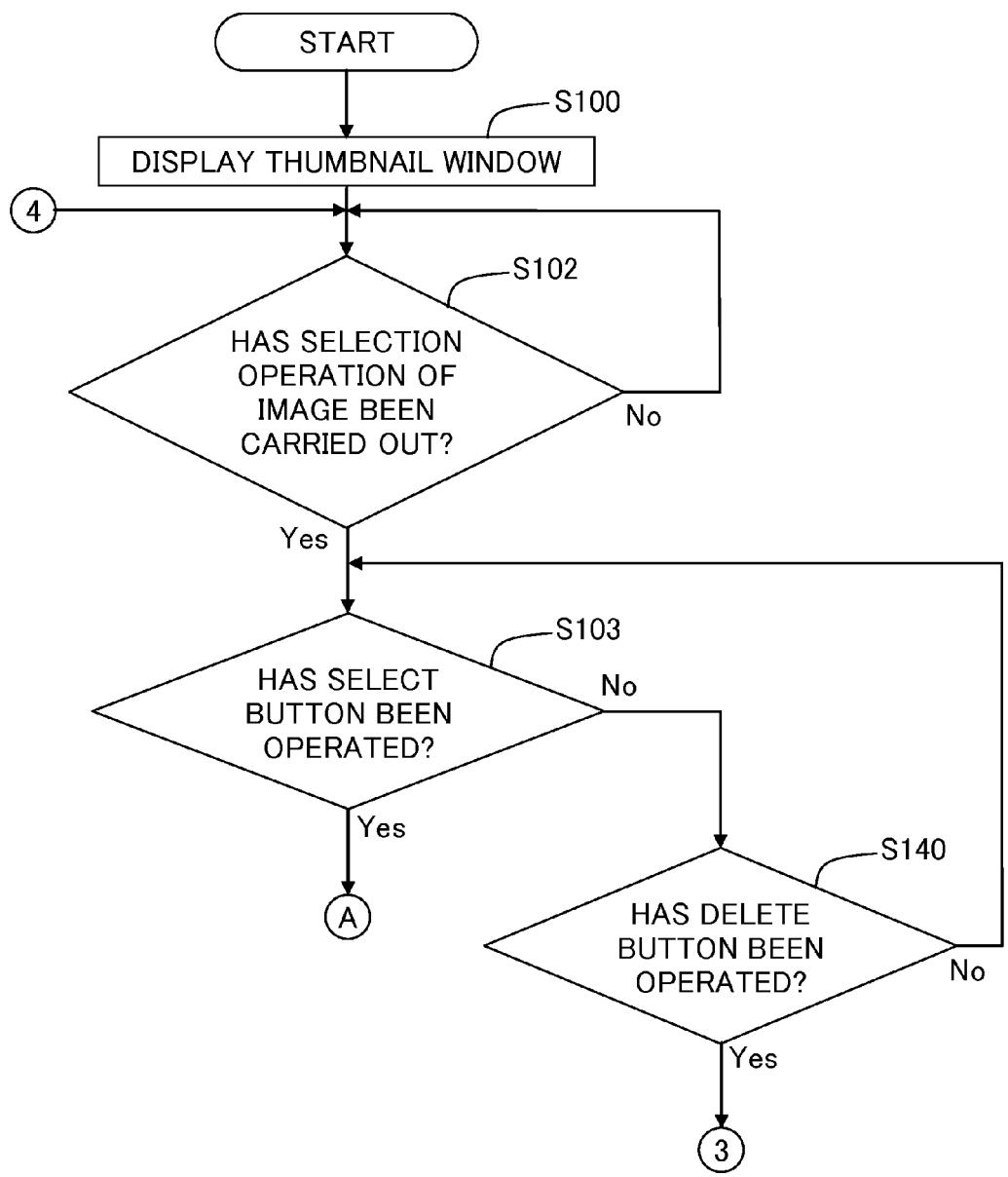
FIGS. 11A to 11D show a flowchart showing an operation of a PC.
Figure 11B:
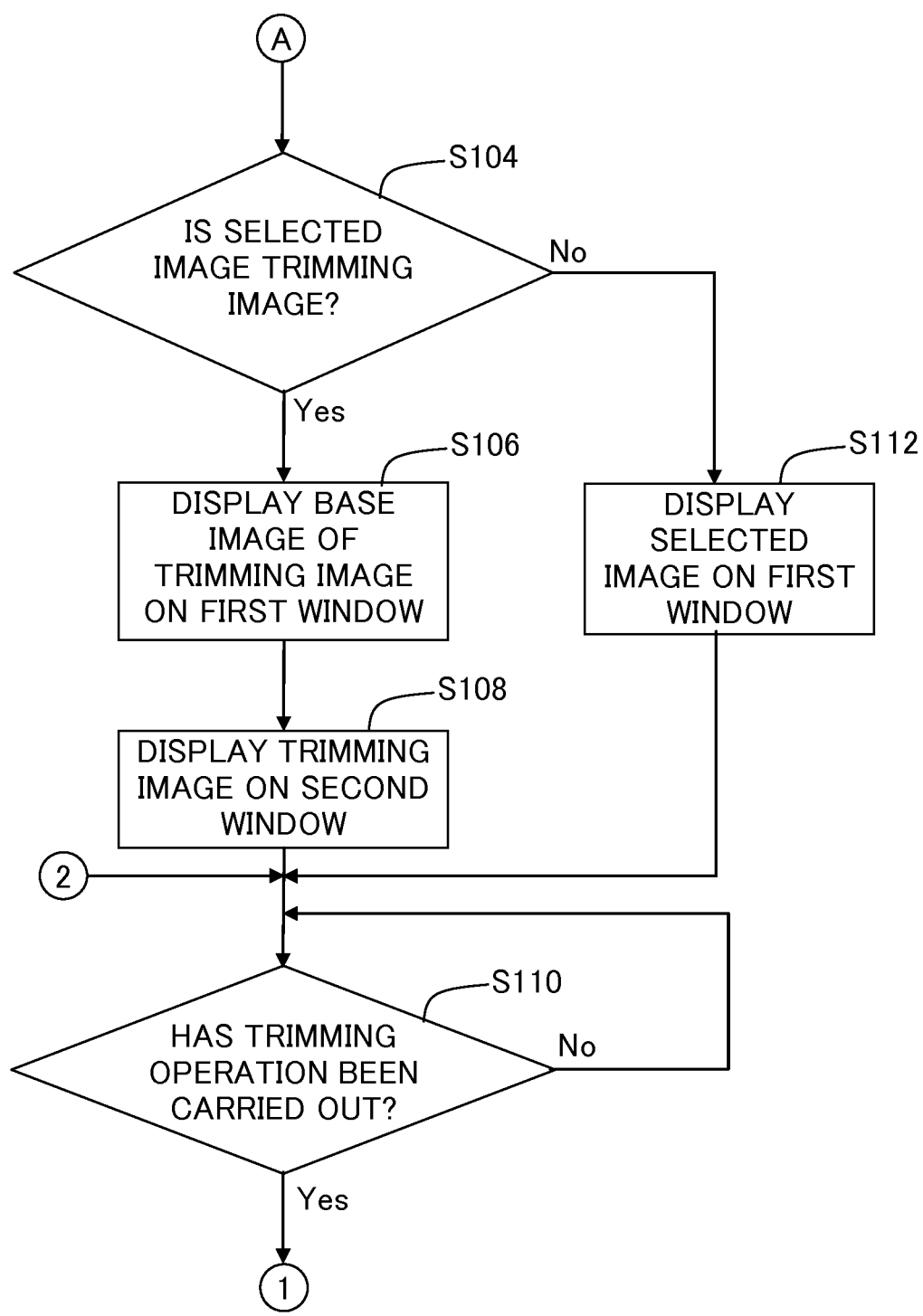
Figure 11C:
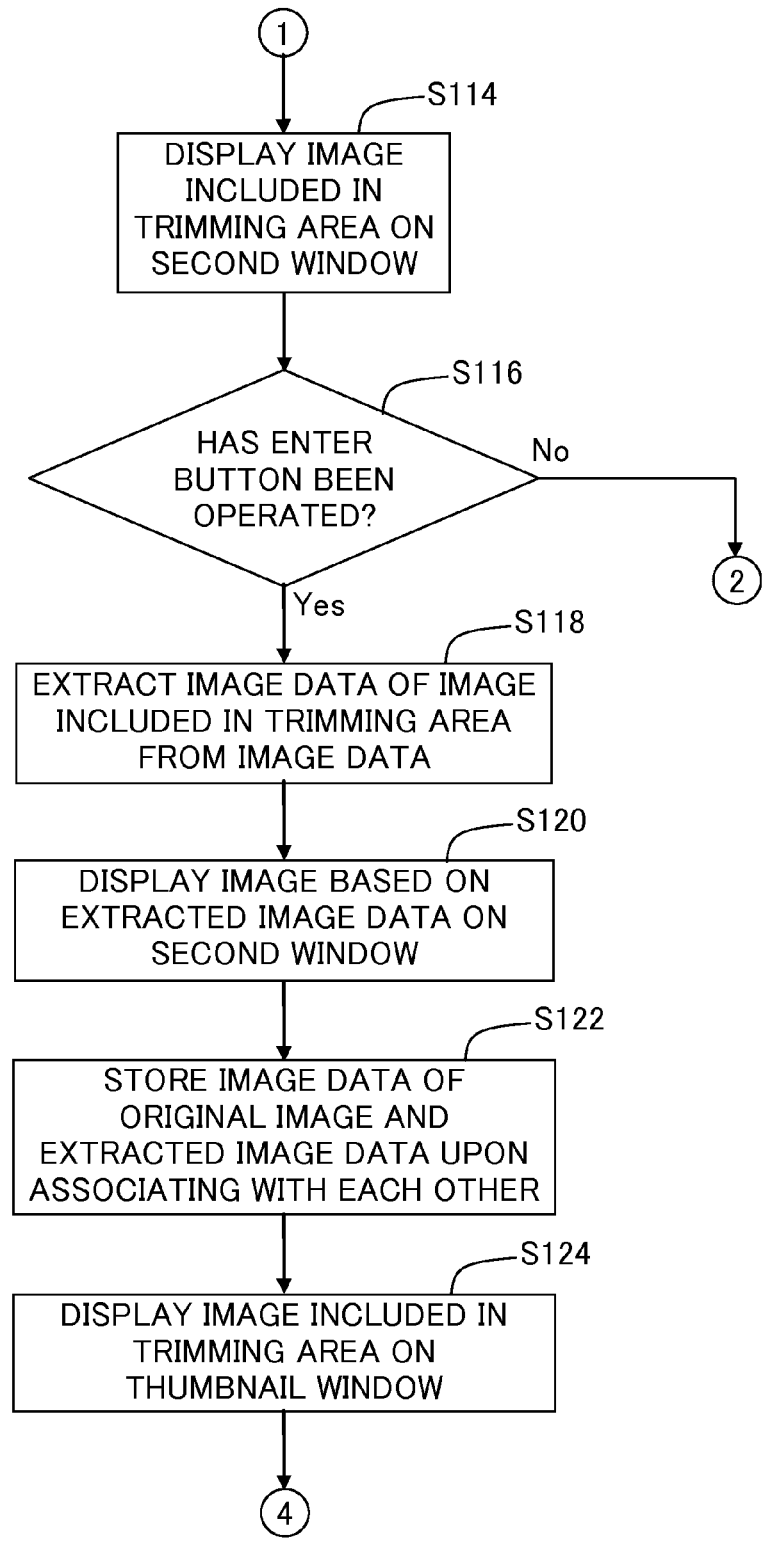
Figure 11D:
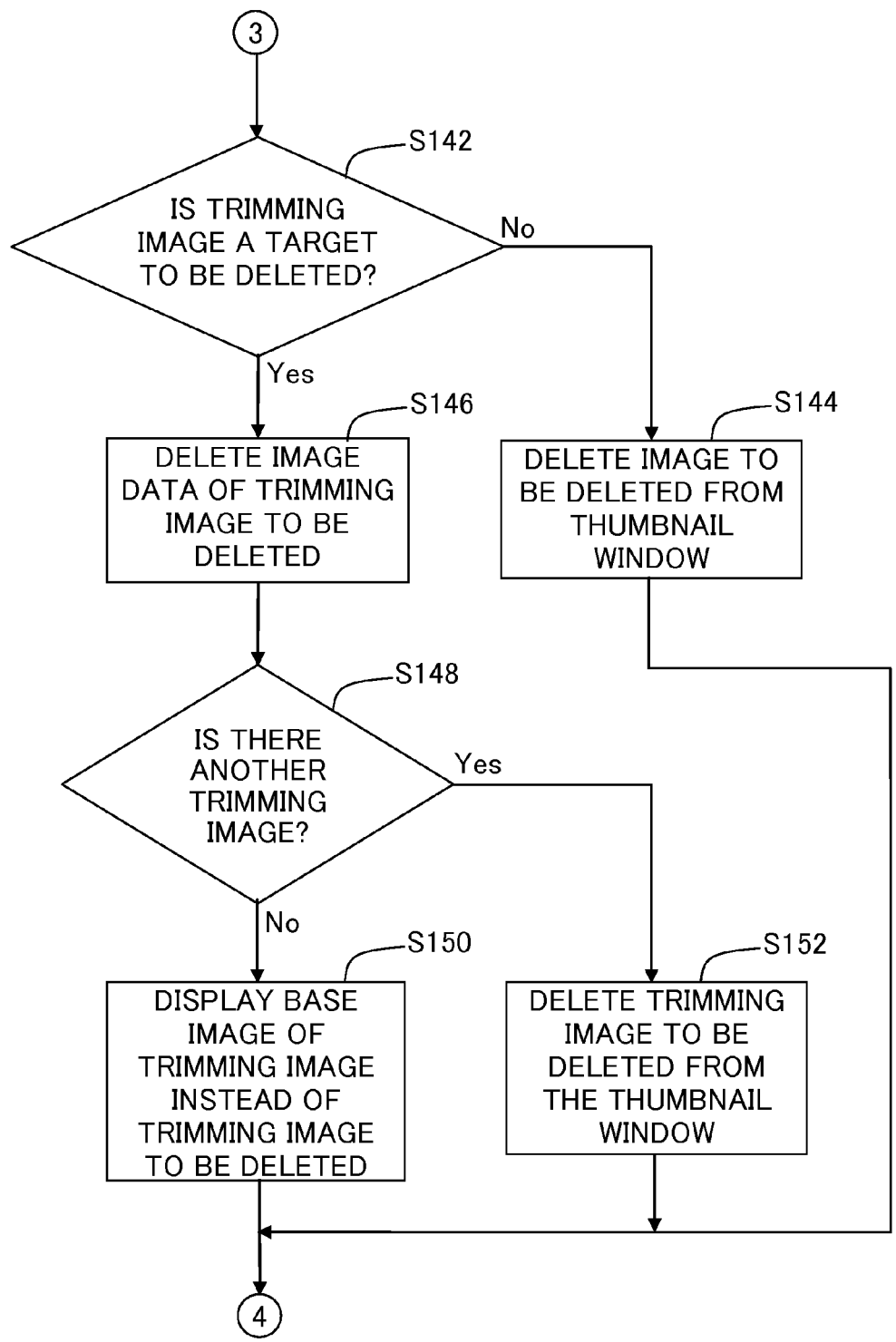

Moreover, as the enter button 86 is operated in a state of the trimming image 108 displayed on the second area 82, the thumbnail window 50 is displayed instead of the trimming window 78 on the panel 16 as shown in FIG. 10. Images excluding the trimming image 90 from among the plurality of images 52 etc. that had been displayed on the thumbnail window 50 in FIG. 5 are displayed on the thumbnail window 50, and the trimming image 108 is displayed instead of the trimming image 90. In other words, the trimming image 90 is deleted from the plurality of images 52 etc. that had been displayed on the thumbnail window 50 in FIG. 5, and the trimming image 108 is displayed instead of the trimming image 90.

In such manner, in the PC 10, as the trimming image is selected on the thumbnail window 50, since the trimming image selected and an image before that trimming image is subjected to the trimming processing are displayed side-by-side, it is possible to carry out easily the trimming processing once again (re-trimming processing). When the trimming image 108 created by the re-trimming processing is displayed on the thumbnail window 50, an identification mark 110 is displayed at an upper left side of the trimming image 108. The identification mark 110, similarly as the identification marks 92 and 100, has a circular shape. Accordingly, user is able to recognize easily that the trimming image 108 is an image trimmed from the image same as the trimming image 90.

Moreover, as the delete button 72 is operated in a state of a selection operation carried out for the trimming image on the thumbnail window 50, the trimming image is deleted. In a case that there is no other trimming image that has been trimmed from the image before the trimming image deleted is subjected to the trimming processing, remained on the thumbnail window 50, the image before the trimming processing is displayed on the thumbnail window 50 instead of the trimming image to be deleted.

For instance, as the delete button 72 is operated after the selection operation is carried out for the trimming image 98 on the thumbnail window 50 in FIG. 7, the trimming image 98 is deleted from the thumbnail window 50 as shown in FIG. 5. The trimming image 90 displayed on the thumbnail window 50 in FIG. 5 being an image trimmed from the target image 54 before the trimming image 98 that has been deleted is subjected to the trimming processing, the target image 54 is not displayed on the thumbnail window 50. However, as the selection operation is carried out for the trimming image 90, and the delete button 72 is operated on the thumbnail window 50 in FIG. 5, the trimming image 90 is deleted from the thumbnail window 50 as shown in FIG. 2. There is no other trimming image that has been trimmed from the target image 54 before the trimming image 90 that was deleted is subjected to the trimming processing, remained on the thumbnail window 50 in FIG. 2. Therefore, the target image 54 before the trimming image 90 is subjected to the trimming processing is displayed instead of the trimming image 90 on the thumbnail window 50. Accordingly, it is possible to return easily the trimming image subjected to the trimming processing to a state before being subjected to the trimming processing, and it is possible to improve an operability of the trimming processing.

<Control Program>

The abovementioned trimming processing is carried out by the control program 26 being executed by the CPU 12 of the PC 10. A flow when the control program 26 is executed by the CPU 12 will be described below while referring to FIGS. 11A to 11D. The flow is executed repeatedly till a selection operation for an end button that is not shown in the diagram on the thumbnail window 50 is carried out.

As the control program 26 is executed and an arbitrary folder is selected from among a plurality of folders stored in the data storage area 28, images based on a plurality of images in that arbitrary folder are displayed on the panel 16 of the PC 10 (step S100). In other words, the thumbnail window 50 is displayed on the panel 16. Next, a judgment of whether or not a selection operation of an image has been carried out on the thumbnail window 50 is made by the CPU 12 (step S102). In a case that the selection operation has not been carried out (NO at step S102), a processing at step S102 is repeated.

Whereas, in a case that the selection operation of an image has been carried out (YES at step S102), a judgment of whether or not the select button 70 has been operated is made (step S103). In a case that the select button 70 has been operated (YES at step S103), the process advances to step S104, and in a case that the select button 70 has not been pressed (NO at step S103), the process advances to step S140. At step S104, a judgment of whether or not the image selected is a trimming image is made by the CPU 12 (step S104). In a case that the image selected is a trimming image (YES at step S104), an image which is a base of the trimming image selected, or in other words, a target image before the trimming image that was selected is subjected to the trimming processing is displayed on the first area 80 (step S106). Next, the trimming image that was selected is displayed on the second area 82. Thereafter, the process advances to step S110.

Whereas, in a case that the image selected is not a trimming image (NO at step S104), the image selected is displayed on the first area 80 (step S112). Thereafter, the process advances to step S110. At step S110, a judgment of whether or not the trimming operation has been carried out is made by the CPU 12 (step S110). In other words, a judgment of whether or not a predetermined area has been specified by a drag operation for the image displayed on the first area 80 is made by the CPU 12. In a case that the trimming operation has not been carried out (NO at step S110), the processing at step S110 is repeated.

Whereas, in a case that the trimming operation has been carried out (YES at step S110), the image in the area specified by the trimming operation, or the image in the area demarcated by the demarcation lines 88 is displayed as the trimming image, on the second area 82 (step S114). Next, a judgment of whether or not the enter button 86 has been operated is made by the CPU 12 (step S116). In a case that the enter button 86 has not been operated (NO at step S116), the process returns to step S110.

Whereas, in a case that the enter button 86 has been operated (YES at step S116), image data inside the area demarcated by the demarcation lines 88 is extracted from image data of an image which is to be subjected to the trimming processing (step S118). Next, an image based on the image data extracted, or in other words, the trimming image, is displayed on the second area 82 (step S120). Thereafter, image data of the image before the trimming processing and the image data extracted are associated and stored in the storage unit 14 (step S122). Next, the thumbnail window 50 is displayed instead of the trimming window 78, and the trimming image is displayed instead of a target image before the trimming processing, on the thumbnail window 50 (step S124). Thereafter, the process returns to step S102.

Moreover, at step S140, a judgment of whether or not an operation for deleting an image has been carried out is made by the CPU 12 (step S140). In other words, a judgment of whether or not the delete button 72 has been operated in a state of a selection of the image carried out on the thumbnail window 50 is made by the CPU 12. In a case that the operation for deleting the image has not been carried out (NO at step S140), the process returns to step S103.

Whereas, in a case that the operation for deleting the image has been carried out (YES at step S140), a judgment of whether or not an image which is to be subjected to the deletion operation is a trimming image is made by the CPU (step S142). In a case that the image which is to be subjected to the deletion operation is not a trimming image (NO at step S142), the image selected from the thumbnail window 50 is deleted (step S144). Thereafter, the process returns to step S102.

Whereas, in a case that the image which is to be subjected to the deletion operation is a trimming image (YES at step S142), the image data of the trimming image which is to be subjected to deletion, is deleted (step S146). Next, a judgment of whether or not there is other trimming image that has been trimmed from the target image before the trimming image which is to be deleted is subjected to the trimming processing, remained on the thumbnail window 50 is made by the CPU 12 (step S148). In a case that there is no other trimming image remained on the thumbnail window 50 (NO at step S148), an image before that trimming image is subjected to the trimming processing is displayed instead of the trimming image to be subjected to deletion, on the thumbnail window 50 (step S150). Next, the process returns to step S102. Whereas, in a case that there is other trimming image remained on the thumbnail window 50 (YES at step S148), the trimming image which was to be deleted is deleted from the thumbnail window 50 (step S152). Thereafter the process returns to step S102.

The present teaching is not restricted to the embodiment described heretofore, and it is possible to implement the present teaching by various aspects with various modifications and improvements made based on knowledge of a person skilled in the art. For instance, in the embodiment described above, the area which is to be subjected to the trimming processing specified by a user operation is shown by demarcation lines 88 etc. However, an area which is to be subjected to the trimming processing may be indicated by using a color tone for an image in an area which is to be subjected to the trimming processing different from a color tone in the rest of the area.

Figure 12:
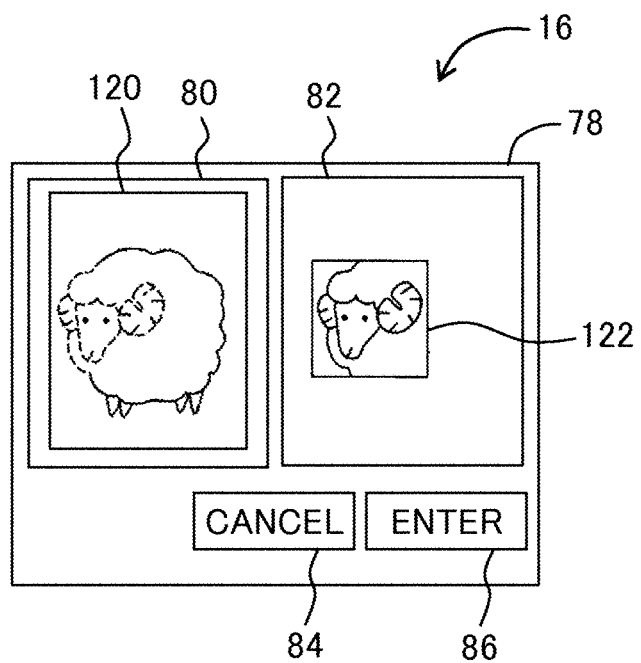
FIG. 12 is a diagram showing a modified example of the trimming window.

For instance, as shown in FIG. 12, in a case that the trimming operation is carried out for the illustration image 120, in a state of an illustration image 120 of a sheep is displayed on the first area 80 of the trimming window 78, by letting a color hue in an area which is to be subjected to the trimming operation differ from a color hue of the rest of the area, the user is able to identify the area which is to be subjected to the trimming operation. In a case that the demarcation lines 88 etc. are displayed on an image, sometimes the demarcation area 88 cannot be identified appropriately due to overlapping of the image and the demarcation area 88. However, by changing the color hue of the area which is to be subjected to the trimming processing, the user is able to identify clearly the area which is to be subjected to the trimming processing. Moreover, an image in the area which is to be subjected to the trimming processing is displayed as a trimming image 122 on the second area 82. However, the trimming image 122 is displayed on the second area 82 with the color hue before changing. In FIG. 12, an area indicated by dashed lines is an area indicated in a state in which the hue is changed.

In the aforementioned embodiment, as the trimming image 90 is prepared by the trimming processing on the target image 54, the trimming image 90 is displayed on the second area 82. However, the trimming image 90 may be displayed on the first area 80.

Moreover, in the aforementioned embodiment, as the trimming image 90 is prepared by the trimming processing on the target image 54, the trimming image 90 is displayed instead of the target image 54 on the thumbnail window 50. However, both the target image 54 and the trimming image 90 may be displayed on the thumbnail window 50.

Moreover, in the aforementioned embodiment, as the plurality of trimming images is trimmed from one target image 54, an identification mark of the same shape is assigned to the plurality of trimming images. However, the background color may be let to be same for the plurality of trimming images trimmed from one target image 54.

Moreover, in the aforementioned embodiment, the PC 10 has been used as a device for executing the trimming processing. However, a portable terminal such as a smartphone may be used as a device for executing the trimming processing. Moreover, the mouse 18 has been used as an operation unit for carrying out the trimming operation. However, operation button and touch panel etc. may be used as an operation unit for carrying out the trimming operation.

Moreover, in the aforementioned embodiment, examples in which processing shown in diagrams such as FIGS. 11A to 11D are executed have been described. However, without restricting to the CPU 12, these processing may be executed by a logic integrated circuit such as an ASIC (application specific integrated circuit), or these processing may be executed in coordination by a CPU, an ASIC, and other logic integrated circuit.

What is claimed is:

1. A non-transitory computer-readable medium storing computer-executable programs that, when executed by a processor, cause an information processing apparatus provided with a display unit having a display surface and an operation unit configured to output a signal depending on a user operation, to perform:

receiving selection of a target image, on which a trimming operation is to be performed, from among a plurality of thumbnail images in a thumbnail window, the target image being stored in a memory;

displaying the target image in a first area of the display surface, the display surface including the first area and a second area different from the first area, the second area having a same size as the first area and positioned adjacent to the first area;

specifying a selected area corresponding to a part of the target image based on the signal outputted from the operation unit depending on the user operation with respect to the target image;

displaying a selected-area image which is an image corresponding to the selected area that has been specified, in the second area which is different from the first area, with the selected-area image having a size same as a size of the selected area that has been specified and a same relative position within the second area as compared to the selected area in the first area; and storing, in the memory, the target image and the selected-area image upon associating each other;

wherein a non-selected-area image, which is another part of the target image and not corresponding to the selected area, is not displayed in the second area.

2. The medium according to claim 1, wherein the information processing apparatus further provided with a storage unit, the programs cause the information processing apparatus to further perform:

displaying, on the display surface, a plurality of images based on a plurality of image data that has been stored in the storage unit; and selecting any one of the plurality of images displayed, based on the signal outputted from the operation unit, and under a condition that the information processing apparatus displays the target image in the first area, the programs cause the information processing apparatus to display the image selected from the plurality of images in the first area as the target image.

3. The medium according to claim 2, wherein the programs cause the information processing apparatus to further perform storing, in the storage unit, selected-area image data of the selected-area image displayed in the second area in association with target image data of the target image displayed in the first area, based on the signal outputted from the operation unit.

4. The medium according to claim 3, wherein under a condition that the information processing apparatus displays the plurality of images on the display surface, in a case that the selected-area image data has been stored in the storage unit in association with the target image data, the programs cause the information processing apparatus to display an image based on the selected-area image data instead of the target image.

5. The medium according to claim 4,
wherein under a condition that the information processing apparatus specifies the selected area, the programs cause the information processing apparatus to specify a plurality of selected areas based on signals outputted from the operation unit depending on user operations with respect to the target image displayed in the first area, under a condition that the information processing apparatus displays the selected-area image in the second area, in a case that the information processing apparatus has specified the plurality of selected areas, the programs cause the information processing apparatus to display, in a second area, a plurality of selected-area images of the specified plurality of selected areas with same sizes as sizes of the specified plurality of selected areas, respectively, and under a condition that the information processing apparatus stores the selected-area image data in the storage unit in association with the target image data, in a case that the plurality of selected-area images has been displayed in the second area, the programs cause the information processing apparatus to store data of the plurality of selected-area images in the storage unit in association with the target image data based on the signal outputted from the operation unit.

6. The medium according to claim 5, wherein under a condition that the information processing apparatus displays the plurality of images on the display surface, in a case that the plurality of selected-area image data has been stored in the storage unit in association with the target image data, the programs cause the information processing apparatus to display a plurality of images of the data of the plurality of selected-area images, instead of the target image, in a same mode.

7. The medium according to claim 6,
wherein under a condition that the information processing apparatus displays the plurality of images on the display surface, the programs cause the information processing apparatus to further perform deleting the image of the selected-area image data that has been displayed on the display surface from the display surface, depending on the signal outputted from the operation unit, and displaying an image based on one image data, instead of the image deleted, in a case that all images of data of the selected-area images, that has been stored in the storage unit in association with one image data, are deleted from the display surface, the programs cause the information processing apparatus to display an image of the one image data on the display surface instead of all the images that have been deleted.

8. The medium according to claim 3, wherein in a case that the information processing apparatus selects the image of the selected-area image data from among the plurality of images displayed on the display unit based on the signal outputted from the operation unit, the programs cause the information processing apparatus to: display, in the first area, the target image of the target image data which has been stored in the storage unit in association with the selected-area image data of the image selected; and specify an area, of the target image displayed in the first area, corresponding to the image of the selected-area image data as the selected area.

9. The medium according to claim 8, wherein in a case that the information processing apparatus specifies the area, of the target image displayed in the first area, corresponding to the image of the selected-area image data as the selected area, the programs cause the information processing apparatus to update the specified selected area based on the signal outputted from the operation unit depending on user operation with respect to the target image displayed in the first area.

10. The medium according to claim 1, wherein the programs cause the information processing apparatus to display the target image in the first area, such that the selected area that has been specified is distinguishable from an area, of the first area, other than the selected area.

11. The medium according to claim 1, wherein after the selected area has been specified, the programs cause the information processing apparatus to display the target image in a state that color tone of the selected area is changed.

12. The medium according to claim 1,
wherein the information processing apparatus further provided with a communication unit which is capable of communicating with a scanner, and the programs cause the information processing apparatus to display an image, of scan data received from the scanner via the communication unit, in the first area as the target image.

13. An information processing apparatus comprising:
a display unit having a display surface;
an operation unit configured to output a signal depending on a user operation; and
a controller,
wherein the controller is configured to:
receive selection of a target image, on which a trimming operation is to be performed, from among a plurality of thumbnail images in a thumbnail window, the target image being stored in a memory;
display the target image in a first area of the display surface, the display surface including the first area and a second area different from the first area, the second area having a same size as the first area and positioned adjacent to the first area,
specify a selected area corresponding to a part of the target image, based on the signal outputted from the operation unit depending on the user operation with respect to the target image, display a selected-area image which is an image corresponding to the selected area that has been specified, in the second area which is different from a first area of the display surface, with the selected-area image having a same size as a size of the selected area that has been specified and a same relative position within the second area as compared to the selected area in the first area; and store, in the memory, the target image and the selected-area image upon associating each other;

wherein a non-selected-area image, which is another part of the target image and not corresponding to the selected area, is not displayed in the second area.

14. An information processing method to be executed by an information processing apparatus provided with a display unit having a display surface and an operation unit configured to output a signal depending on a user operation, the method comprising:

receiving selection of a target image, on which a trimming operation is to be performed, from among a plurality of thumbnail images in a thumbnail window, the target image being stored in a memory;

displaying the target image in a first area of the display surface, the display surface including the first area and a second area different from the first area, the second area having a same size as the first area and positioned adjacent to the first area;

specifying a selected area corresponding to a part of the target, based on the signal outputted from the operation unit depending on the user operation with respect to the target image;

displaying a selected-area image which is an image corresponding to the selected area that has been specified, in the second area which is different from the first area, with the selected-area image having a size same as a size of the selected area that has been specified and a same relative position within the second area as compared to the selected area in the first area; and storing, in the memory, the target image and the selected-area image upon associating each other;

wherein a non-selected-area image, which is another part of the target image and not corresponding to the selected area, is not displayed in the second area.

15. The method according to claim 14, wherein the information processing apparatus further provided with a storage unit, the method further comprising:

displaying, on the display surface, a plurality of images based on a plurality of image data that has been stored in the storage unit; and selecting any one of the plurality of images displayed, based on the signal outputted from the operation unit, and under a condition that the information processing apparatus displays the target image in the first area, the information processing apparatus displays the image selected from the plurality of images in the first area as the target image.

16. The method according to claim 15, wherein the method further comprising storing, in the storage unit, selected-area image data of the selected-area image displayed in the second area in association with target image data of the target image displayed in the first area, based on the signal outputted from the operation unit.

17. The method according to claim 16, wherein under a condition that the information processing apparatus displays the plurality of images on the display surface, in a case that the selected-area image data has been stored in the storage unit in association with the target image data, the information processing apparatus displays an image based on the selected-area image data instead of the target image.

* * * * *